United States Patent [19]

Bravo

[11] Patent Number: 4,852,368

[45] Date of Patent: Aug. 1, 1989

[54] EVAPORATOR FOR COOLANT FLUIDS

[75] Inventor: Francesco Bravo, Montecchio Maggiore, Italy

[73] Assignee: Bravo S.p.A., Vincenza, Italy

[21] Appl. No.: 242,181

[22] Filed: Sep. 9, 1988

[30] Foreign Application Priority Data

Sep. 25, 1987 [IT] Italy .................. 22037 A/87

[51] Int. Cl.⁴ ............................. F25B 39/02
[52] U.S. Cl. ...................... 62/515; 165/154; 165/168
[58] Field of Search ............ 62/515, 524, 525, 526; 165/154, 168

[56] References Cited

U.S. PATENT DOCUMENTS

| 1,983,466 | 12/1934 | Kline | 165/154 |
| 2,030,233 | 2/1936 | Thoma | 62/515 |
| 3,001,767 | 9/1961 | Straubing | 165/154 |
| 3,016,893 | 1/1962 | Brown, Jr. | 165/154 X |
| 3,197,975 | 8/1965 | Boling | 62/515 X |
| 3,507,324 | 4/1970 | Mueller | 165/154 X |

Primary Examiner—William E. Tapolcai
Attorney, Agent, or Firm—Shlesinger, Fitzsimmons & Shlesinger

[57] ABSTRACT

An evaporator for coolant fluids comprises two tabular elements of different diameter that are inserted coaxially one into the other so as to form a circumferential space within which coolant fluid can circulate. The said space is subdivided into a plurality of adjacent annular chambers by means of a series of annular baffles force-fitted in a sealing manner between the said two tubular elements. The said annular chambers intercommunicate by means of at least a bore made in each of the said baffles, the bore of one baffle being made diametrically opposite the bore in the adjacent baffle. At the opposed ends of the evaporator provision is also made for an inlet duct and for an outlet duct for the coolant fluid.

2 Claims, 2 Drawing Sheets

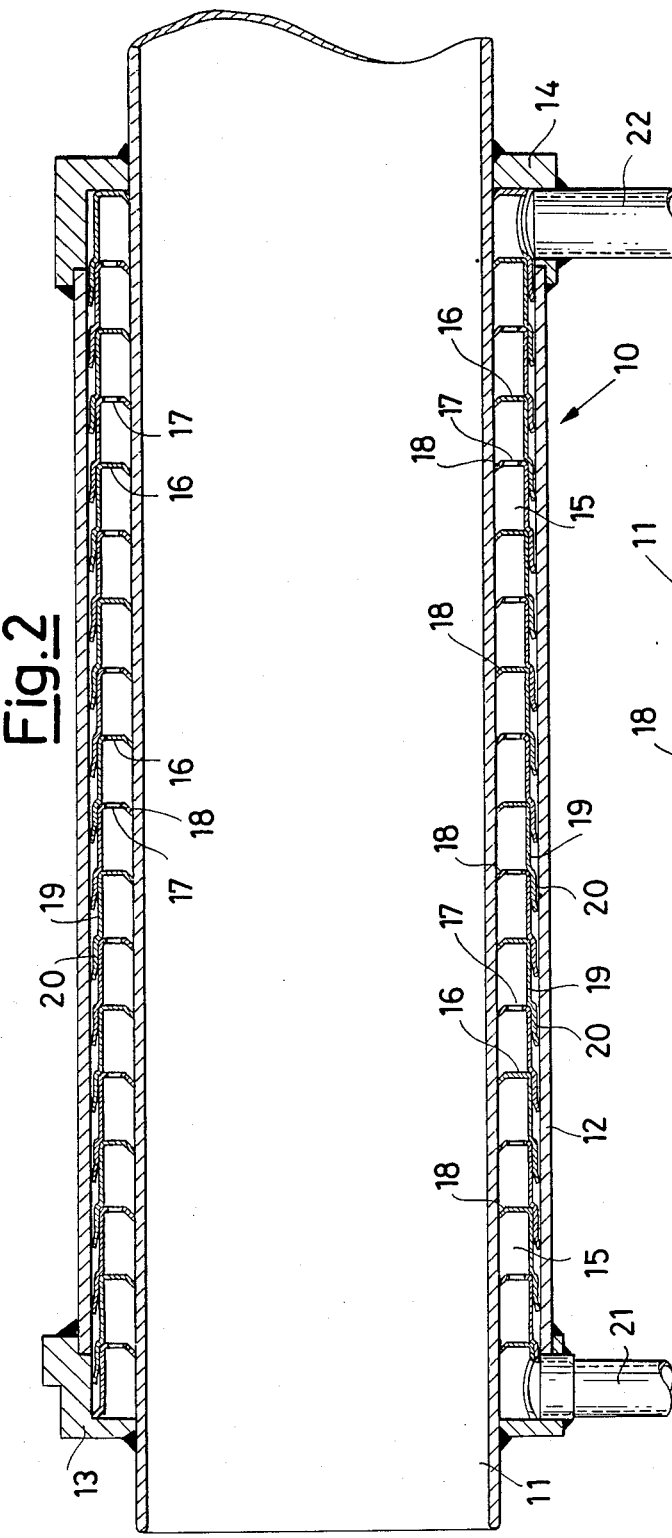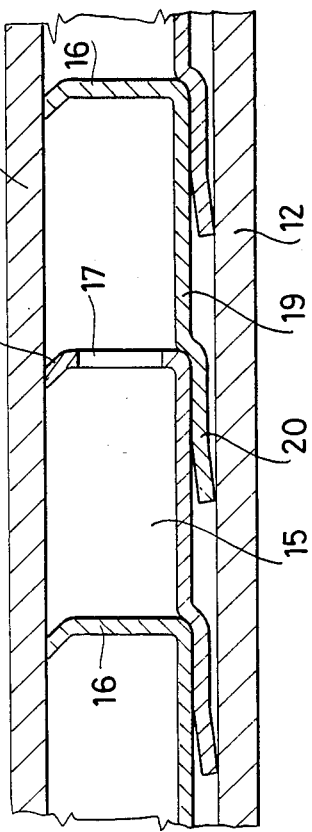

EVAPORATOR FOR COOLANT FLUIDS

The present invention relates to an improved evaporator for coolants, particularly but not exclusively adapted for use in foodstuff pasteurizers and devices for whisking icecream, especially for producing so-called soft icecream.

Evaporators are known in which the coolant is passed through a hollow space formed between the walls of two tubular elements of different diameter inserted one into the other.

In embodying evaporators of such type the problem requiring solution is minimization of coolant pressure drops and at the same time assurance that the coolant itself laps the entire heat-exchange surface in an even manner.

It is known to solve this problem by means of a labyrinthine path for the coolant, by threading the outer tube internally, which is however a somewhat costly process and depth of the threading is limited so that the evaporator is suitable only in the case of relatively high temperatures because of the low coolant flow rate.

The overall object of the present invention is to satisfactorily resolve the aforesaid technical problem by embodying an evaporator which, through very economical to manufacture, features a labyrinthine circuit by means of which the coolant can evenly lap the entire heat exchange surface with minimal pressure drop.

To attain the said object, the invention embodies an evaporator for coolant fluids, of the type comprising two tubular elements of different diameter inserted coaxially one into the other so as to form a circumferential space for coolant circulation, wherein the said space is subdivided into a plurality of adjacent annular chambers by means of a series of annular baffles force-fitted in a sealing manner between the said two tubular elements, the said annular chambers intercommunicating by means of at least a bore made through each of the said baffles, the bore of one baffle being in a position diametrically opposite the bore of the adjacent baffles, provision also being made at the opposite ends of the evaporator for an inlet and outlet duct for the coolant.

Each of the said annular baffles typically features a clawed circumferential edge which is pressure-fitted onto the internal tubular element and a collar having a conical portion adapted to couple to the collar of the adjacent baffles, the external tubular element being pressure-fitted onto the said conical portion.

The structural and functional characteristics of the invention, and its advantages over the known art, will become more apparent from an examination of the following description, referred to the appended drawings which shown an example of an evaporator embodied according to the innovative principles of the invention. In the drawings:

FIG. 2 is a longitudinal section of the evaporator of FIG. 1; and

FIG. 3 is a view of an enlarged particular.

Figure 1:
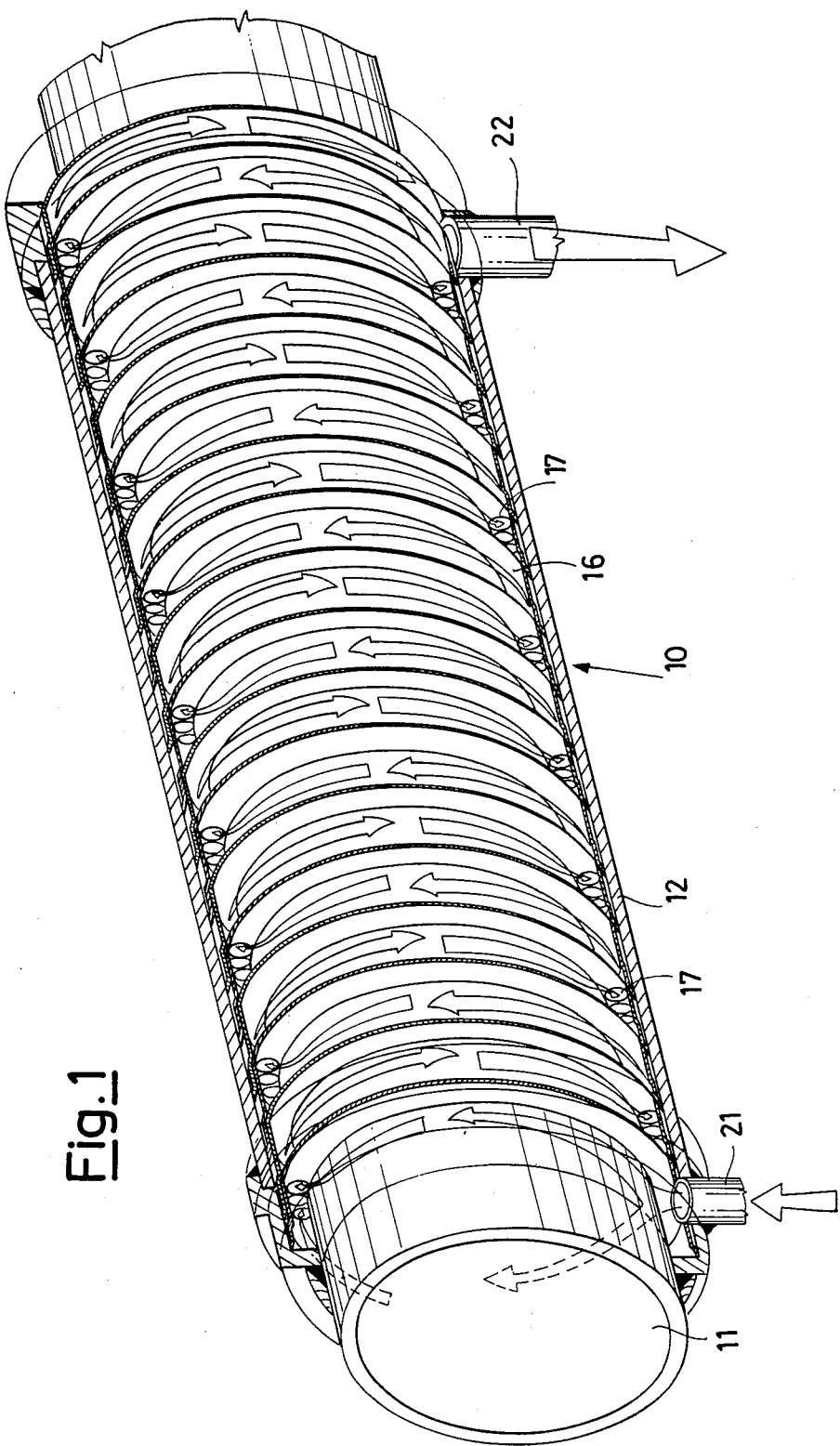
FIG. 1 is a cutaway perspective and sectioned view illustrating an evaporator embodied according to the invention.

With reference to the drawings, the evaporator in question is indicated overall by 10 and consists structurally of two tubular elements 11, 12 of different diameter, internal and external respectively, which are inserted one into the other so as to form between them a space for coolant circulation. The elements 11, 12 are fixed to each other by terminal flanges 13, 14 welded onto them.

In accordance with the invention, the space formed between the two tubular elements is subdivided into a plurality of circumferential chambers 15 by means of a series of adjacent annular baffles 16. The chambers 15 intercommunicate by means of sets of bores 17 in the baffles 16; as FIGS. 1 and 2 clearly show, the bores 17 of adjacent baffles 16 are diametrically opposed.

More specifically, with particular reference to FIG. 3, each baffle 16 features a circumferential edge, in the form of a claw 18, and a collar 19 having a conical portion 20.

The baffles 16 can in this way be force-fitted, through the agency of the claw 18, onto the internal tubular element 11, the conical portions 20 of the baffles 16 surmounting the collar 19 of the adjacent baffles 16. The external tubular element 12 is then force-fitted onto the said portions 20. Alternatively, the conical portion 20 can be welded to the collar 19.

The numerals 21 and 22 indicate, respectively, a coolant inlet duct and a coolant outlet duct at the opposite ends of the evaporator; the path followed by the coolant within the evaporator is indicated in FIG. 1 by arrows.

It will in this connection be seen that the coolant leaving the alternate bores divides in two opposed directions, using the same channel, until reaching the successive bores, and so on.

In this way there is a double passage section and an evaporator length divided in half, with the resulting advantage of an equal service pressure and thus an equal distribution of coolant along the evaporator.

It will also be seen that the evaporator according to the invention is extremely economical to manufacture, since it requires no costly threading operations but simply the making of the baffles 16, which can be sheared and drawn.

I claim:

1. An evaporator for coolant fluids of the type comprising two tubular elements of different diameter coaxially inserted one into the other so as to form therebetween a circumferential space for coolant circulation, a plurality of annular baffles between said elements operatively dividing said space into a plurality of adjacent annular chambers intercommunicating by means of at least a bore through each of said baffles, the bore of one baffle being in a position diametrically opposite the bore of an adjacent baffle, there being at opposite ends of the evaporator a coolant inlet and a coolant outlet duct, respectively, and wherein each of said annular baffles has a clawed circumferential edge which is pressure-fitted onto said tubular element, and a collar having a conical portion adapted to couple to the collar of the adjacent baffle, said other tubular element being pressure-fitted onto the conical portions of said baffles.

2. An evaporator for coolant fluids of the type comprising two tubular elements of different diameter coaxially inserted one into the other so as to form therebetween a circumferential space for coolant circulation, a plurality of annular baffles between said elements operatively dividing said space into a plurality of adjacent annular chambers intercommunicating by means of least a bore through each of said baffles, the bore of one baffle being in a position diametrically opposite the bore of an adjacent baffle, there being at opposite ends of the evaporator a coolant inlet and a coolant outlet duct, respectively, and wherein each of said annular baffles has a clawed circumferential edge which is pressure-fitted onto said one tubular element, and a collar having a conical portion welded thereon and adapted to couple to the collar of the adjacent baffle, said other tubular element being pressure-fitted onto the conical portions of said baffles.

* * * * *